United States Patent Office 2,997,381
Patented Aug. 22, 1961

2,997,381
2-HALOALLYL N-ALKYL DITHIOCARBANI-LATES FOR CONTROLLING UNDESIRABLE VEGETATION
John J. D'Amico, Nitro, W. Va., assignor to Monsanto Chemical Company, St. Louis, Mo., a corporation of Delaware
No Drawing. Filed Apr. 1, 1958, Ser. No. 725,497
12 Claims. (Cl. 71—2.6)

The present invention relates to a method of controlling vegetation by applying thereto a toxic concentration of a 2-haloallyl N-alkyl carbanilate and to herbicidal compositions containing these toxicants as the essential active ingredient.

While esters of dithiocarbamic acids include a large number of phytotoxic materials, the presence of an aryl group on the nitrogen generally reduces the effectiveness markedly. There has been found, however, a very effective class of phytotoxic esters containing an N-phenyl substituent which may be represented by the general formula

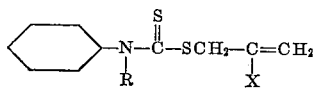

where R represents an alkyl group containing at least two carbon atoms and preferably less than five and X represents halogen. X is preferably a middle halogen but may be fluorine or iodine.

Several methods are available for making the compounds of this class. A procedure which has given good results involves the ammonium salt of the corresponding dithiocarbanilate with a 2-haloallyl halide. For example, 2-bromoallyl N-ethyl dithiocarbanilate was prepared as follows: Approximately 60.6 grams of N-ethylaniline was dissolved in 100 ml. of ethyl alcohol and 50 grams concentrated ammonium hydroxide. This solution was stirred while to it was added in one portion 50 grams carbon bisulfide. The reaction mixture was stirred at 25–30° C. for one hour. There was then added 77.7 grams of 2-bromoallyl chloride. The addition caused the temperature to rise from 28 to 45° C. The reaction mixture was then stirred at 25–30° C. for 24 hours and then 400 ml. of water was added. After stirring for 15 minutes the reaction mixture was extracted with 400 ml. of ethyl ether and the ether extract washed with dilute hydrochloric acid until the aqueous layer did not yield any amine upon neutralization with 25% sodium hydroxide. The ether solution was then washed with water until neutral to litmus and dried over sodium sulfate. The ether was removed in vacuo at a maximum temperature of 80–90° C. at 1–2 mm. There was obtained 109 grams (69.1% yield) of 2-bromoallyl N-ethyldithiocarbanilate as an amber oil. It contained 4.1% nitrogen as compared to 4.4% nitrogen calculated. The properties of other typical examples of the new toxicants prepared in similar manner are summarized below.

Table I

| Compound | Physical Appearance | Analysis | | |
|---|---|---|---|---|
| | | | Calcd. | Found |
| 2-Chloroallyl N-ethyldithiocarbanilate. | solid, m.p. 40–42° C. | Percent N | 5.2 | 5.1 |
| | | Percent S | 23.6 | 23.3 |
| | | Percent Cl | 13.0 | 13.1 |
| 2-Chloroallyl N-butyl-dithiocarbanilate. | amber oil | Percent N | 4.7 | 4.7 |
| 2-Chloroallyl N-hexyl-dithiocarbanilate. | do | Percent N | 4.3 | 4.3 |
| 2-Chloroallyl N-propyl-dithiocarbanilate. | do | Percent N | 4.9 | 4.9 |
| 2-Chloroallyl N-isopropyldithiocarbanilate. | do | Percent N | 4.9 | 4.2 |
| 2-Chloroallyl N-isobutyl-dithiocarbanilate. | do | Percent N | 4.7 | 4.3 |

The toxicants of this invention are valuable as grass-specific herbicides. They are toxic to grass foliage. The compounds where R in the general formula above is ethyl or a branched chain alkyl group of 3 or 4 carbon atoms are particularly valuable as pre-emergent grass-specific herbicides. Useful results are achieved by bringing the toxicants in contact with growing plants by which is meant application to the soil before the plants emerge whereby the toxicant is brought into contact with germinating seedlings or application to foliage after emergence. The toxicant may be applied conveniently in the form of a spray containing the active ingredient within the range of 0.1%–5%. For pre-emergence application amounts within the range of 1 to 60 pounds per acre are recommended. The active components are insoluble in water but they are soluble in common organic solvents. They may be dispersed directly in water or dissolved first in an organic solvent and then dispersed. As dispersing and wetting agents there may be employed soft or hard sodium or potassium soaps, alkylated aromatic sodium sulfonates such as sodium dodecylbenzenesulfonate, or an amine salt of dodecylbenzenesulfonic acid, alkali metal salts of sulfated fatty alcohols, ethylene oxide condensation products of alkyl phenols or tall oil and other dispersing and wetting agents. The herbicides may be formulated and applied as dry compositions by mixing the toxicant with a finely divided solid carrier, as for example talc, clay, pyrophyllite, silica and fuller's earth. Alternatively, the dry composition may be dispersed in water and applied as a spray.

Table II illustrates the pre-emergent herbicidal activity. In these tests the ester was emulsified in water and the emulsion applied as a spray. The active ingredient at the indicated dosage per acre was applied to the soil of seeded plots before the grass or other plants emerged.

For convenience in recording the data a numerical rating system was used as follows:

0—No phytotoxicity
    1—Slight phytotoxicity
    2—Moderate phytotoxicity
    3—Severe phytotoxicity The plants are represented in the table by letters as follows:

A. Morning glory   H. Cotton
B. Wild oats       J. Corn
C. Brome-cheat grass   K. Foxtail
D. Rye grass       L. Barnyard grass
E. Buckwheat       M. Crab grass
F. Radish-mustard  N. Field bindweed
G. Sugar-beet      O. Pigweed

Table II

| Active Ingredient | lbs./A | A | B | C | D | E | F | G | H | J | K | L | M | N | O |
|---|---|---|---|---|---|---|---|---|---|---|---|---|---|---|---|
| 2-Chloroallyl N-ethylphenyldithiocarbanilate. | 25 | 1 | 3 | 2 | 1 | 0 | 0 | 2 | 2 | 0 | 2 | 3 | 3 | 0 | 3 |
|  | 5 | 0 | 2 | 2 | 2 | 0 | 0 | 0 | 0 | 0 | 3 | --- | 3 | 0 | 2 |
|  | 2 | 0 | 1 | 1 | 2 | 0 | 0 | 0 | 0 | 0 | 2 | --- | 3 | 0 | 3 |
|  | 1 | 0 | 0 | 0 | 1 | 0 | 0 | 1 | 2 | 0 | 3 | 2 | 3 | 0 | 3 |
| 2-Chloroallyl N-isopropyldithiocarbanilate | 25 | 1 | 1 | 1 | 0 | 0 | 1 | 0 | 2 | 0 | 2 | --- | 3 | 0 | 3 |
| 2-Chloroallyl N-isobutyldithiocarbanilate | 25 | 1 | 2 | 0 | 0 | 0 | 0 | 1 | 0 | 0 | 1 | --- | 3 | 0 | 3 |
| 2-Bromoallyl N-ethyldithiocarbanilate | 25 | 0 | 2 | 1 | 1 | 0 | 0 | 0 | 0 | 0 | 3 | 2 | 3 | 0 | 3 |

Foliage tests were carried out by applying the toxicant as an aqueous spray to the foliage of grass, beans and to a mixture of broadleaf plants. Typical results are summarized below.

Table III

| Active Ingredient | Conc., Percent | Phytotoxicity | | |
|---|---|---|---|---|
|  |  | Grass | Bean | Broadleaf |
| 2-Chloroallyl N-ethyldithiocarbanilate | 0.5 | 2 | 2 | 2 |
| 2-Chloroallyl N-butyl-dithiocarbanilate | 0.5 | 1 | 3 | 1 |
| 2-Chloroallyl N-hexyl-dithiocarbanilate | 0.5 | 1 | 1 | 2 |
| 2-Chloroallyl N-propyl-dithiocarbanilate | 0.5 | 2 | 3 | 2 |
| 2-Chloroallyl N-isopropyl-dithiocarbanilate | 0.5 | 2 | 1 | 3 |
|  | 0.2 | 1 | 0 | 1 |
| 2-Chloroallyl N-isobutyl-dithiocarbanilate | 0.5 | 2 | 2 | 2 |

It is intended to cover all changes and modifications of the examples of the invention herein chosen for purposes of disclosure which do not constitute departures from the spirit and scope of the invention.

What is claimed is:

1. A method of controlling vegetation which comprises applying to foliage thereof a toxic concentration of a compound of the structure

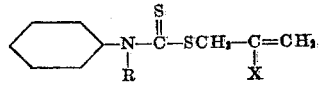

where R represents an alkyl group containing at least two but less than five carbon atoms and X represents halogen.

2. A method of controlling vegetation which comprises applying to germinating grass seedlings a toxic concentration of a compound of the structure

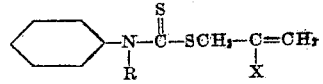

where R represents a member of the group consisting of ethyl and a branched chain alkyl radical containing less than 5 carbon atoms and X represents a member of the group consisting of chlorine and bromine.

3. A method of controlling vegetation which comprises applying to germinating seedlings a toxic concentration of 2-chloroallyl N-ethyldithiocarbanilate.

4. A method of controlling vegetation which comprises applying to germinating seedlings a toxic concentration of 2-bromoallyl N-ethyldithiocarbanilate.

5. A method of controlling vegetation which comprises applying to germinating seedlings a toxic concentration of 2-chloroallyl N-isopropyldithiocarbanilate.

6. A method of controlling vegetation which comprises applying to the foliage thereof a toxic concentration of 2-chloroallyl N-butyldithiocarbonilate.

7. A herbicidal composition comprising a major proportion of a carrier and a small amount sufficient to exert a phytotoxic effect on growing grasses of a compound of the structure

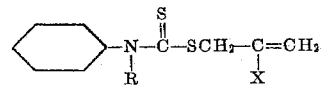

where R represents an alkyl group containing 2–4 carbon atoms and X represents halogen.

8. A herbicidal composition comprising a major proportion of a carrier and a small amount sufficient to exert a phytotoxic effect on growing grasses of a compound of the structure

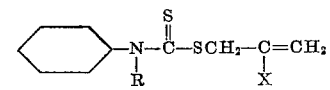

where R represents a member of the group consisting of ethyl and a branched chain alkyl radical containing less than 5 carbon atoms and X represents a member of the group consisting of chlorine and bromine.

9. A herbicidal composition comprising a major proportion of a carrier and a small amount sufficient to exert a phytotoxic effect on growing grasses of 2-chloroallyl N-ethyldithiocarbanilate.

10. A herbicidal composition comprising a major proportion of a carrier and a small amount sufficient to exert a phytotoxic effect on growing grasses of 2-bromoallyl N-ethyldithiocarbanilate.

11. A herbicidal composition comprising a major proportion of a carrier and a small amount sufficient to exert a phytotoxic effect on growing grasses of 2-chloroallyl N-isopropyldithiocarbanilate.

12. A herbicidal composition comprising a major proportion of a carrier and a small amount sufficient to exert a phytotoxic effect on growing grasses of 2-chloroallyl N-butyldithiocarbanilate.

References Cited in the file of this patent

UNITED STATES PATENTS

| Re. 22,750 | Tisdale et al. | Apr. 30, 1946 |
| 2,127,375 | Bousquet | Aug. 16, 1938 |
| 2,535,877 | Stewart | Dec. 26, 1950 |
| 2,744,898 | Harmon et al. | May 8, 1956 |
| 2,766,554 | Dorman | Oct. 16, 1956 |
| 2,854,467 | Harmon et al. | Sept. 30, 1958 |
| 2,863,899 | Harris | Dec. 9, 1958 |
| 2,895,980 | Harmon et al. | July 21, 1959 |

FOREIGN PATENTS

| 858,352 | Germany | Dec. 4, 1952 |
| 205,460 | Australia | Jan. 16, 1957 |

OTHER REFERENCES

Metcalf: "Advances in Pest Control Research," publ. by Interscience Publ., N.Y., 1957, pages 67 and 68.

"Plant Regulators," page 27, CBCC Positive Data Series, No. 2, June 1955, Chemical-Biological Coordination Center.